Aug. 18, 1964 F. A. SAAL 3,145,377
DIGITAL GRAY CODE TO ANALOG CONVERTER UTILIZING STAGE
TRANSFER CHARACTERISTIC-TECHNIQUES
Filed July 16, 1962 2 Sheets-Sheet 1
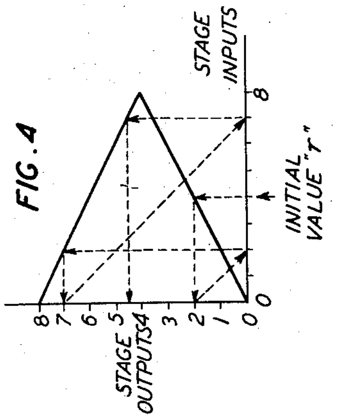
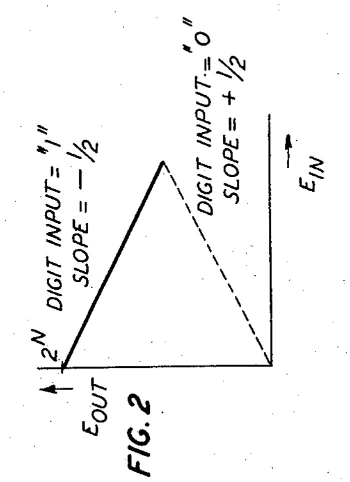
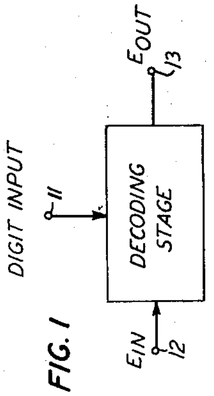
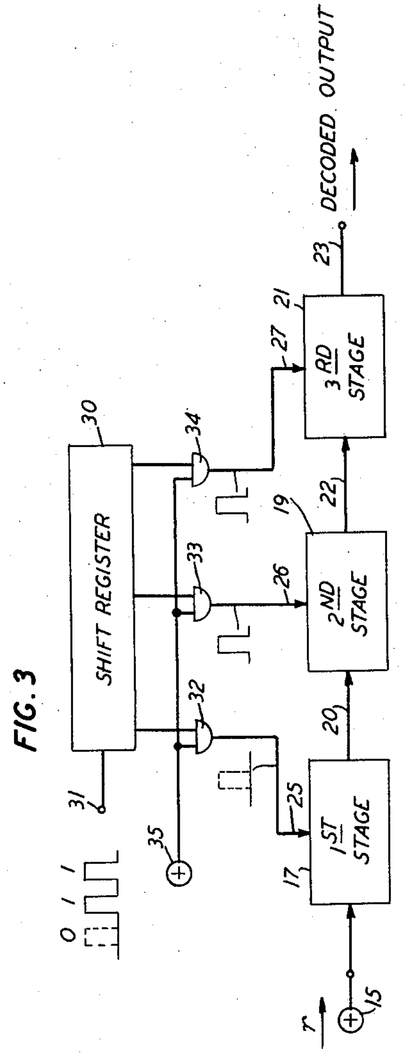
INVENTOR
F. A. SAAL
BY Roy M. Porter Jr.
ATTORNEY INVENTOR
F. A. SAAL
BY [signature]
ATTORNEY

United States Patent Office 3,145,377
Patented Aug. 18, 1964

3,145,377

DIGITAL GRAY CODE TO ANALOG CONVERTER UTILIZING STAGE TRANSFER CHARACTERISTIC-TECHNIQUES

Frederick A. Saal, Plainfield, N.J., assignor to Bell Telephone Laboratories, Incorporated, New York, N.Y., a corporation of New York Filed July 16, 1962, Ser. No. 210,166
4 Claims. (Cl. 340—347)

This invention relates to digital information processing systems and, more particularly, to arrangements for translating groups of pulses which represent signal amplitudes in the reflected binary code into their analog equivalents.

The binary numbering system suggests a particularly convenient method of processing and communicating information. For example, if it is assumed that there are 32 possible "symbols" in a normal written text (the 26 letters plus a space and 5 marks of punctuation), it may be easily shown that each of these 32 symbols might be exclusively represented by a particular group of five binary digits. This follows from the fact that there are 32 different forms in which a group of five "0's" and "1's" might exist. Accordingly, such a written text might be encoded into a binary sequence of "ON" and "OFF" pulses, transmitted in binary form to a receiving station, and there decoded back into the original message signal.

In PCM (pulse code modulation) communication systems, continuous, time-varying "messages," such as electrical speech signals, are also represented by a series of "ON" and "OFF" pulses. In this process, the time-varying signal is first "sampled." It may be proven that if any function of time, $f_{(t)}$, contains no frequency components higher than W cycles per second, then $f_{(t)}$ can be completely determined by specifying its ordinates at a series of points spaced every $$\frac{1}{2W}$$

seconds or less. A speech signal which contains no frequency components higher than 4,000 cycles per second might therefore be completely specified by a series of discrete samples which occur at least at the rate of 8,000 samples per second. In PCM, the permissible range of sample voltages is broken up into a finite number of quantized levels and then, instead of transmitting the samples, a coded signal telling which level the actual signal was nearest to at the sampling time is transmitted. This process of approximation reduces the precision with which the signal may be transmitted and gives rise to what is known variously as "quantization noise" or "quantization distortion."

The fact that the information to be transmitted is digital in nature, however, provides advantages that, in many applications, far outweigh the disadvantage of the introduction of quantization noise. A principal advantage of PCM communication is that the signal may be completely reconstructed by repeaters judiciously deployed along the transmission path—thus virtually eliminating the accumulation in the course of transmission of noise, crosstalk, and other forms of signal degradation. For a thorough exposition of other advantages, as well as the theory and operation of typical PCM systems see, for example, the article "The Philosophy of PCM," by Oliver, Pierce, and Shannon, in volume 36, Proceedings of the IRE, pages 1324 to 1331 (1948); "An Experimental Multichannel PCM System of Toll Quality," by Peterson and Meacham in volume 27, Bell System Technical Journal, pages 1–43 (1948); and "A Mathematical Theory of Communication," by Shannon also in volume 27, BSTJ, pages 379–423 and 623–656 (1948).

As mentioned above, each sample of the message signal is translated into a group of binary digits before transmission—the value assigned to the pulse group being inindicative of the voltage level within which the amplitude of the sample lies. For instance, if the range of possible sample amplitudes were divided into 128 (or $2^7$) separate levels, a 7-digit code group could be used to exclusively specify any given level. An analog speech signal encoded in this manner would consist of repetitiously occurring groups of pulses, each group representing the amplitude of a particular sample.

It is a principal object of the present invention to "decode" such groups of pulses into the original amplitude samples they represent by means of simple, accurate and reliable apparatus.

A more particular object of the present invention is decode groups of pulses which are arranged in accordance with the reflected binary code.

In accordance with a feature of the present invention, decoding is accomplished by a plurality of similar decoding stages connected in tandem, each having a digit input, an analog input, and an analog output. The analog output of the first stage is connected to the analog input of the next—and so on. The decoded sample amplitude appears at the analog output of the last stage. Each of these stages is characterized in that the signal delivered to its analog output is functionally related to the signal applied to its analog input by a first predetermined relationship whenever a "0" is applied to its digit input and by a second predetermined relationship whenever a "1" is applied to its digit input.

A more complete understanding of the invention may be gained from the following detailed description of a specific embodiment of the invention along with the appended drawings in which:

FIG. 1 is a simple block diagram of a single decoding stage employed in the present invention;

FIG. 2 is a graphical representation of the transfer characteristic of a single decoding stage used in one embodiment of the invention;

FIG. 3 is a schematic diagram of a simplified three-digit decoder as contemplated by the present invention;

FIG. 4 illustrates the manner in which a decoding arrangement of the type shown in FIG. 3 may be employed to decode the reflected binary code group 110 into its equivalent decimal number 4;

Figure 6:
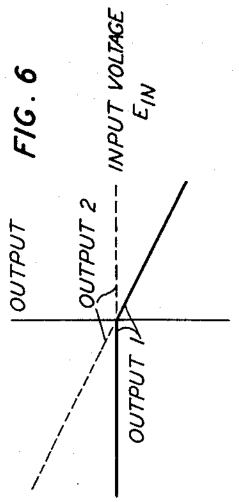
FIG. 6 illustrates the transfer characteristics of the circuit shown in FIG. 3.

In constructing binary code groups, the significance of the value assigned to each digit is dependent upon its position within the code group. In conventional binary codes each digit is weighted in proportion to $2^{d-1}$ where $d$ is the digit number. Thus, in a conventional 7-digit binary code wherein the most significant digit, $d_7$, appears first, the number 38 would be written 0100110. The manner of computing the value of such a code group is illustrated below in Table I:

*Table I*

$$d_7(=0)\times 2^6=0$$
$$d_6(=1)\times 2^5=32$$
$$d_5(=0)\times 2^4=0$$
$$d_4(=0)\times 2^3=0$$
$$d_3(=1)\times 2^2=4$$
$$d_2(=1)\times 2^1=2$$
$$d_1(=1)\times 2^0=0$$
$$\text{Total}=\overline{38}$$

U.S. Patent 2,632,058 which issued to F. Gray on March 17, 1953 describes a coding scheme which offers certain distinct advantages over the more conventional binary code described above. These advantages follow from a particular characteristic of the Gray code, namely, that no two successive numbers differ by more than a single digit. The Gray code has also been termed "the reflected-binary code" due to the manner in which the code is constructed. It should be noted that there are variations of the reflected binary code other than the more common "primary" form. By way of example, the number 38, which is represented in the primary form of the reflected binary code by the group 0110101, may be designated instead by the group 1001010 (the "0's" in the primary form becoming "1's" and the "1's" becoming "0's"). The manner of forming other variants of the reflected binary code is discussed in detail in the aforementioned Gray patent. For illustrative purposes, however, the primary form of the reflected binary code will hereinafter be adhered to.

U.S. Patent 2,538,615 which issued to R. L. Carbrey on January 16, 1951, describes apparatus for carrying out digit weighting operations somewhat similar to those indicated in Table I and thus for translating reflected binary code groups into signal sample amplitudes for reproduction. The decoding arrangement suggested by Carbrey possesses a significant advantage over other prior art reflected binary decoders in that it is capable of translating reflected binary code groups directly into their analog equivalents without first translating into the conventional binary code. The Carbrey decoder does, however, suffer the disadvantage of being both complex and expensive.

The present invention contemplates a process of directly decoding reflecting binary code groups by means of a novel sequential decoding scheme. According to this process, an arbitrary initial value, $r$, is chosen and this value is then subjected to a sequence of $n$ mathematical operations, the character of each operation being dependent respectively upon each of the $n$ digits in the code group (in order of increasing significance). The result at the end of the last operation is representative of the analog equivalent of the code group. The operations may be stated simply. If the digit is a "0," the result from the last operation is multiplied by ½; if the digit is a "1," it is multiplied by —½ and added to the quantity $2^n$. Thus 0110101, the reflected-binary equivalent of the number 38, is a 7-digit code group for which $2^n=128$. Starting with the least significant digit, $d_1$, the initial value is subjected to the sequence of operations shown below in Table II.

*Table II*

[Initial value$=r$]

$$d_1=1;\ 128-(\tfrac{1}{2})(r)=128-r/2$$
$$d_2=0;\ \tfrac{1}{2}(128-r/2)=64-r/4$$
$$d_3=1;\ 128-\tfrac{1}{2}(64-r/4)=96+r/8$$
$$d_4=0;\ \tfrac{1}{2}(96+r/8)=48+r/16$$
$$d_5=1;\ 128-\tfrac{1}{2}(48+r/16)=104-r/32$$
$$d_6=1;\ 128-\tfrac{1}{2}(104-r/32)=76+r/64$$
$$d_7=0;\ \tfrac{1}{2}(76+r/64)=38+r/128$$

It may be noted that the result from the last operation shown on Table II was not precisely 38 but was rather $38+r/128$. If, in the example given in Table III, $r$ was set at a mid-range value of 64, the small value added to the result would become particularly useful. It may be remembered that in PCM applications the decoded output does not represent a discrete value but instead is indicative of a small range of values, the quantizing interval. Hence, the "zero level" indicates that the sample amplitude lies somewhere between zero and one. Since the actual signal will, according to the usual approximation, occur with equal probability within each step, assigning a midstep voltage to all amplitudes falling within the interval minimizes the mean square error introduced by the quantizing process. By setting $r$ to be equal to 64 in the example shown in Table II, the result from the last operation would have been 38½—the midstep value of the level 38. There is still another reason for choosing a mid-range initial value which, however, will be more readily understood following a more detailed consideration of the invention.

The present invention provides apparatus for carrying out the sequential decoding scheme illustrated by Table II. Each operation is carried out in a decoding stage having, as illustrated in FIG. 1, a digit input 11, an analog input 12, and an analog output 13. The functional relationship between the analog input voltage $E_{IN}$ and the analog output voltage $E_{OUT}$ is under the control of the digit input. If the digit applied is a "0," the analog input voltage is to be multiplied by ½. If the digit is a "1," it is to be multiplied by —½ and added to a fixed voltage representative of the quantity $2^n$. This transfer characteristic is illustrated in FIG. 2. With a digit input of "0," the transfer characteristic is the lower, broken line-segment having a positive slope of ½. The application of a "1" to the digit input changes the transfer characteristic to the upper, solid line-segment which intersects the ordinate at $2^n$ and has a slope of —½.

FIG. 3 of the drawings schematically illustrates a simplified embodiment of the present invention. The decoder comprises three stages connected in tandem. Each of these stages is of the type illustrated in FIG. 1 and each has a transfer characteristic of the type shown in FIG. 2. A positive voltage representative of the initial value quantity $r$ is obtained from a suitable source and applied to terminal 15, the analog input terminal of stage 17. The analog output from stage 17 is applied to the analog input of the second stage 19 by means of conductor 20. Similarly, the analog output from stage 19 is applied to the analog input of the third stage 21 by means of conductor 22. The analog output 23 from the third stage 21 supplies the decoded output signal. Decoding stages 17, 19 and 21 are supplied with digit inputs 25, 26 and 27, respectively.

As mentioned earlier, the encoded pulse signal from the transmission path consists of repetitiously occurring groups of pulses, each group representing the amplitude of a particular sample. Since the pulses will normally appear at the receiving terminal in series (that is, one after another) and since all of the pulses in the group are to be applied to their respective stages simultaneously, it will often be necessary to convert the serially occurring pulses into parallel form. The shift register 30 shown in FIG. 3 affords a well-known means of affecting this conversion. The pulses were applied to input terminal 31 of the shift register 30 and, after being shifted into the register, they appear at the three output conductors. Each of these output conductors is connected to an input terminal of one of the three AND gates 32, 33 and 34. Each of these three AND gates is provided with an additional input terminal which is connected to the terminal 35. A fixed control voltage is applied to terminal 35 from an available source. The outputs from AND gates 32, 33 and 34 are respectively applied to the digit inputs 25, 26 and 27, respectively.

By way of example, assume that the pulse group applied to input terminal 30 comprises two ON pulses followed by an OFF pulse. In this group the first occurring pulse represents the most significant digit. After the three digit group has been shifted into register 31, this first pulse will be applied to one input terminal of AND gate 34. Similarly, the second most significant digit is applied to an input terminal of AND gate 33 and the least significant to an input of gate 32. Since the first and second most significant digits were both ON pulses, the voltage from terminal 35 is gated through gates 33 and 34 and applied to digit input terminals 26 and 27, while no additional voltage is applied to digit input 25.

The operation of the arrangement shown in FIG. 3 may be more readily understood when considered in conjunction with the diagram of FIG. 4. The abscissa of the graph shown on FIG. 4 represents the input voltages which are applied to the stages while the ordinate represents the output voltages. The initial value voltage from terminal 15 is applied to the input of the first stage and the magnitude of this voltage is representative of an initial value *r*. As shown in FIG. 4, this voltage, which represents the quantity four, is approximately in the middle of the range of possible input voltages. Since a digit input voltage representing a "0" is applied to conductor 25, the transfer characteristic of the first stage is the lower line-segment and the input voltage is multiplied by ½. Accordingly, the voltage delivered to output conductor 20 of stage 17 is equal to a voltage representative of the output value 2. In the next stage, whose digit input is a "1," this value of 2 is translated into the value 7 which is delivered into the conductor 22. The last stage, having received a "1" at its digit input, also employes the upper line-segment as a transfer characteristic and accordingly delivers an output value representative of 4.5 as shown in FIG. 4.

Figure 5:
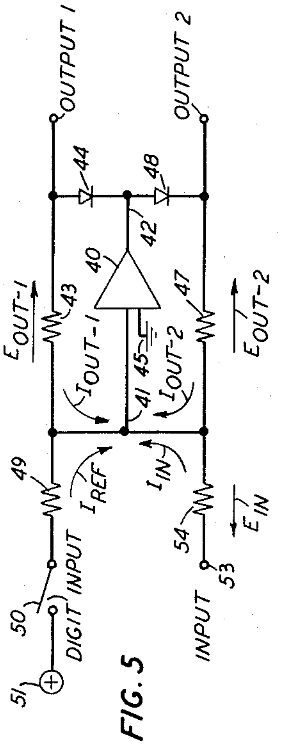
FIG. 5 is a schematic diagram of a novel circuit arrangement which may be employed in the decoding scheme contemplated by the invention.

FIG. 5 of the drawings is a schematic diagram of stage circuitry which may be employed to realize the desired transfer characteristic. As shown in FIG. 5, a high gain operational amplifier 40 is provided with an input conductor 41, an output conductor 42, and a ground connection 45. A resistance 43 is serially connected with a diode 44 between the input and output of amplifier 40. Diode 44 is poled in the direction of positive current flow from input 41 to output 42. A similar connection comprising resistance 47 and diode 48 is also provided, the exception being that, in this case, diode 48 is poled in the direction of positive current flow from output 42 to input 41. An output terminal designed "OUTPUT 1" is connected to the junction of resistance 43 and diode 44 and an output terminal designated "OUTPUT 2" is connected to the junction of resistance 47 and diode 48. A resistance 49 and a switch 50 are connected between the input conductor 41 and terminal 51. Stage input terminal 53 is connected to input conductor 41 by means of resistance 54. Resistances 43 and 47 have a value of "R" ohms, while resistance 54 has a value of "2R" ohms. Resistance 49 has a nominal resistance of $R_0$ ohms.

The network illustrated by FIG. 5 is capable of producing an output characteristic of the type shown in FIG. 6. The operational amplifier 40 shown in FIG. 5 is characterized in that it possesses both a high voltage and a high current gain. The amplifier 40 may be considered to be a "differential" amplifier which delivers an output voltage whose magnitude is equal to the difference between the potential at input 41 and ground potential times the extremely high voltage gain of the amplifier. Accordingly, whenever the output voltage at output 42 is finite, the voltage at input 41 is substantially at ground potential. Similarly, whenever the output current is finite, the input current is negligible. Further, the amplifier 40 is an "inverting" amplifier—that is, it delivers a negative output to conductor 42 whenever the input is positive.

In the network of FIG. 5, at least one of the two diodes 44 and 48 will always be back-biased and consequently substantially nonconducting. For negative inputs to amplifier 40, diode 44 is reverse biased and both $E_{OUT-1}$ and $I_{OUT-1}$ equal zero. Likewise, when the quantity $(I_{IN}+I_{REF.})$ is positive, diode 48 is nonconducting and both $E_{OUT-2}$ and $I_{OUT-2}$ equal zero. The output voltage delivered from the conducting feedback path is equal to R (the value of both resistor 43 and resistor 47) times the sum of the currents $I_{REF.}$ and $I_{IN}$.

Remembering that the value of resistance 54 is equal to 2R and that the value of resistance 49 is $R_0$, it may be shown that the voltage delivered from the conducting feedback path equals the quantity:

$$\frac{E_{REF.}R}{R_0}+\frac{E_{IN}}{2}$$

Then, if the values of $E_{REF.}$, R and $R_0$ are chosen such that the first term in the above quantity represents the full range value $2^n$, then the transfer characteristic shown by the upper solid line segment of FIG. 2 is achieved. With the switch 50 off (that is, with a digit input equal to "0"), the output voltage is of the correct magnitude but the wrong polarity.

Figure 7:
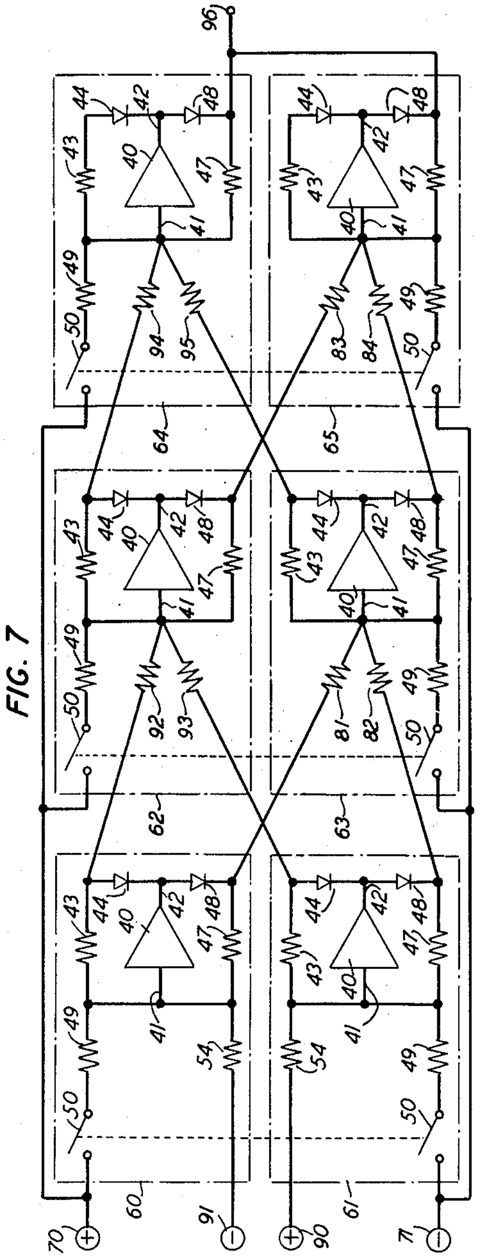
FIG. 7 is a schematic diagram of a preferred embodiment of a three-digit reflected binary decoder employing the principles of the invention.

By using identical stages operating in phase opposition, however, it is possible to achieve the characteristic of FIG. 2. FIG. 7 of the drawings illustrates such a configuration. As shown in FIG. 7, six decoding stages 60 through 65 are interconnected to form a three-digit reflected binary decoder.

Each of the stages shown in FIG. 7 comprises circuitry which is similar to that pictured in FIG. 5 and like circuit elements have been designated by like numerals in both figures. The ground connection 45 shown in FIG. 5 has been omitted from the amplifiers in FIG. 7 to simplify the drawing. Stages 60, 62 and 64 are each connected to the positive terminal 70 by means of the switches 50. Terminal 70 supplies a positive voltage, $E_{REF.}$, through switch 50 and resistance 49 to input conductor 41 of each amplifier 40. The resistances 49 in stages 61, 63 and 65 are connected to the negative terminal 71 by means of the switches 50 in those stages.

It may be noted in FIG. 7 that the diodes 48 are poled such that the voltages existing at the junction of resistance 47 and diode 48 in each stage will always be positive with respect to the input conductor 41 of each stage. It will be remembered that input conductor 41 is at substantially ground potential in all stages. The cathodes of diodes 48 in stages 60 and 61 are connected by means of resistors 81 and 82 to the input 41 of stage 63. The cathodes of the diodes 48 of stages 62 and 63 are connected in a similar manner to input 41 of stage 65 by means of resistors 83 and 84, respectively. It may also be seen from FIG. 7 that terminal 90 is connected to resistance 54 of stage 61 such that it delivers an initial value voltage $+r$ to the input of that stage. Accordingly, the input voltages to each of lower stages 61, 63 and 65 are positive in all cases.

Conversely, the analog inputs to each of the upper stages 60, 62 and 64 are negative. This results from the fact that the diodes 44 are poled such that only negative voltages exist at the junction of resistance 43 and diode 44 in each of the stages. A negative initial value voltage, $-r$ is applied to terminal 91 which, in turn, is connected to resistance 54 of stage 60. The anodes of diodes 44 of stages 60 and 61 are connected to the stage input 41 of stage 62, by resistors 92 and 93, respectively. Similarly, the diodes 44 of stages 62 and 63 are connected to the input 41 in stage 64 by resistors 94 and 95, respectively. The cathodes of diodes 48 of stages 64 and 65, the last two stages in the network, are connected together and to the decoded output terminal 96. To more clearly understand the operation of the embodiments of the invention pictured in FIG. 5, it may be helpful to consider in conjunction therewith the process illustrated by FIG. 4. FIG. 4, it will be remembered, illustrates the manner in which the reflected-binary representation of 4, "110," is decoded. In the code group "110," by the convention used above, the most significant digit appears first. Since the most significant digit is a "1," the switches 50 in stages 64 and 65 would be closed. The middle significant digit also being a "1," the switches 50 in stages 62 and 63 would also be closed. The least significant digit, a "0," results in the switches 50 of the first pair of stages 60 and 61 being left open. The initial value voltage $r$ is applied with negative polarity to the analog input of stage 60 and with positive polarity to the analog input of stage 61. Since a negative voltage is applied to the input of operational amplifier 40 of stage 60 and since the amplifier 40 inverts this voltage and applies a positive voltage to the junction of diodes 44 and 48, only diode 48 conducts. The voltage across resistor 92 therefore is zero with respect to amplifier input 41 of stage 60. As discussed in conjunction with FIG. 5, the voltage existing across resistor 81 will be equal to the voltage applied to resistance 54 of stage 60 multiplied by $-\frac{1}{2}$—that is $+(\frac{1}{2})r$.

The operation of stage 61 is almost identical to that of stage 60 except that the polarities have been reversed. Terminal 90 applies a positive voltage to the analog input of stage 61, and accordingly, a negative voltage appears at the output of amplifier 40 of stage 61. Diode 44 therefore conducts and diode 48 of stage 61 is back-biased. A voltage equal to $-(\frac{1}{2})r$ is applied across resistor 93 and a zero voltage is applied across resistor 82. It will be noted that the voltages applied to resistance 54 of stages 62 and 63 are equal in magnitude but have opposite polarities.

Since the middle significant digit of the code group 110 is a "1" and switches 50 in stages 62 and 63 are consequently closed, reference voltages from terminals 70 and 71 are applied to stages 62 and 63, respectively. As discussed in conjunction with FIG. 5, the output voltages which appear at the junction of the feedback resistance and the forward-biased diode is, in the case wherein the switch 50 is closed, equal to $2^n-\frac{1}{2}E_{IN}$ (where $2^n$ is a nominal voltage whose magnitude is determined in part by the magnitude of the voltage delivered to terminals 70 or 71 and the resistances 49 and wherein $E_{IN}$ is the voltage delivered to the resistance 54). The voltage appearing across resistor 94 is therefore equal in magnitude to $2^n-\frac{1}{2}(\frac{1}{2}r)$ and induces a current flowing away from input 41 therethrough. Diode 48 of stage 62 being back-biased, the voltage across resistor 83 is zero as it is across resistor 95. The voltage across resistance 84 is equal to $2^n-\frac{1}{2}(\frac{1}{2}r)$ and is of opposite polarity to that voltage applied across resistor 94.

In like manner, stages 64 and 65, the switches being closed under the control of the most significant digit, deliver a voltage to output terminal 96 equal to $2^n-\frac{1}{2}[2^n-\frac{1}{2}(\frac{1}{2}r)]$ or $$\frac{1}{2}2^n+\frac{r}{8}$$

Since $n$ is equal to 3 for the three-digit code group being decoded, $2^n$ is equivalent to 8 and the output voltage is therefore representative of $$4+\frac{r}{8}$$

If $r$ is chosen to have a mid-range value of $$\frac{2^n}{2}$$

(as is shown in FIG. 4), then the decoded output is equal to $4\frac{1}{2}$.

As mentioned earlier, the choice of a mid-range initial value for $r$ is not entirely arbitrary. Besides the fact that a mid-range $r$ places the output voltage in the middle of the desired quantizing interval, it should also be noted that if $r$ is chosen to be either "0" or $2^n$, then the capacity of the decoder is reduced by a digit. This may be appreciated when it is realized that, with an input to any stage equal to $2^n$, the application of a digit to that stage is without effect. This necessarily happens in the first stage if $2^n$ is chosen for the initial value and in some later stage if "0" is chosen.

The above-described decoder has been presented in order to illustrate the principles of the invention. It will, of course, be obvious to those skilled in the art that many variations of the embodiments described are possible. The circuitry may be extended, for example, to be capable of decoding code groups having any desired number of digits. For example, polarities, element values, the manner of interconnecting the stages, as well as the configuration of the stages themselves, may be modified in many ways without departing from the true spirit and scope of the present invention.

What is claimed is:

1. Translating apparatus for converting information in the form of a group of $n$ digits into an electrical quantity whose amplitude is related to the value of said group of digits which comprises, in combination, $n$ translating stages, each being provided with a digit input, an analog input and an analog output and each being characterized in that the signal appearing at the analog output of each stage is functionally related to the signal applied to the analog input by a first relationship whenever the digit applied to said digit input is a first symbol and by a second relationship whenever the applied digit is a second symbol, circuit means for connecting said stages in a tandem configuration, the analog output of one stage being connected to the analog input of the next stage, input means for applying each of said $n$ digits to the digit input of the respective one of said $n$ stages, and output means connected to the analog output of the last stage in said tandem configuration of stages for delivering a signal whose amplitude is representative of the value of said group of $n$ digits.

2. An arrangement as defined in claim 1 wherein each of said stages comprises, in combination, a pair of feedback loops having a common portion, a source of gain included in said common portion, a unidirectional conducting device connected in series with each of said loops, said devices being poled such that at least one of said loops is nonconducting at all times, signal input means connected to said common portion, first signal output means connected to one of said loops, and second signal output means connected to the other of said loops.

3. Decoding apparatus for translating groups of binary digits into their analog equivalents which comprises, in combination, at least first and second stages each being provided with a digit input, an analog input, and an analog output and each stage being characterized in that the signal appearing at the analog output is functionally related to the signal applied to the analog input by a first relationship whenever a "1" is applied to said digit input and by a second relationship whenever a "0" is applied to said digit input, input means for applying a first digit in said group of digits to the digit input of said first stage and for applying a second digit input in said group of digits to the digit input of said second stage, circuit means for connecting the analog output of said first stage to the analog input of said second stage, and output means connected to the analog output of said second stage for delivering a signal whose magnitude is representative of the value of said group of digits.

4. Decoding apparatus as set forth in claim 3 wherein each of said stages comprises in combination, an amplifier, input and output circuits for said amplifier, at least a first circuit path including the series combination of an impedance and a diode connected between said input circuit and said output circuit, means connecting said analog output to the junction of said diode and said impedance, means connecting said analog input to the input circuit of said amplifier, a source of a reference signal, and gating means responsive to a selected one of the symbols applied to said digit input for applying said reference signal to said input circuit of said amplifier.

References Cited in the file of this patent

UNITED STATES PATENTS 3,049,701 Amdahl et al. ----------- Aug. 14, 1962